Figure 1:
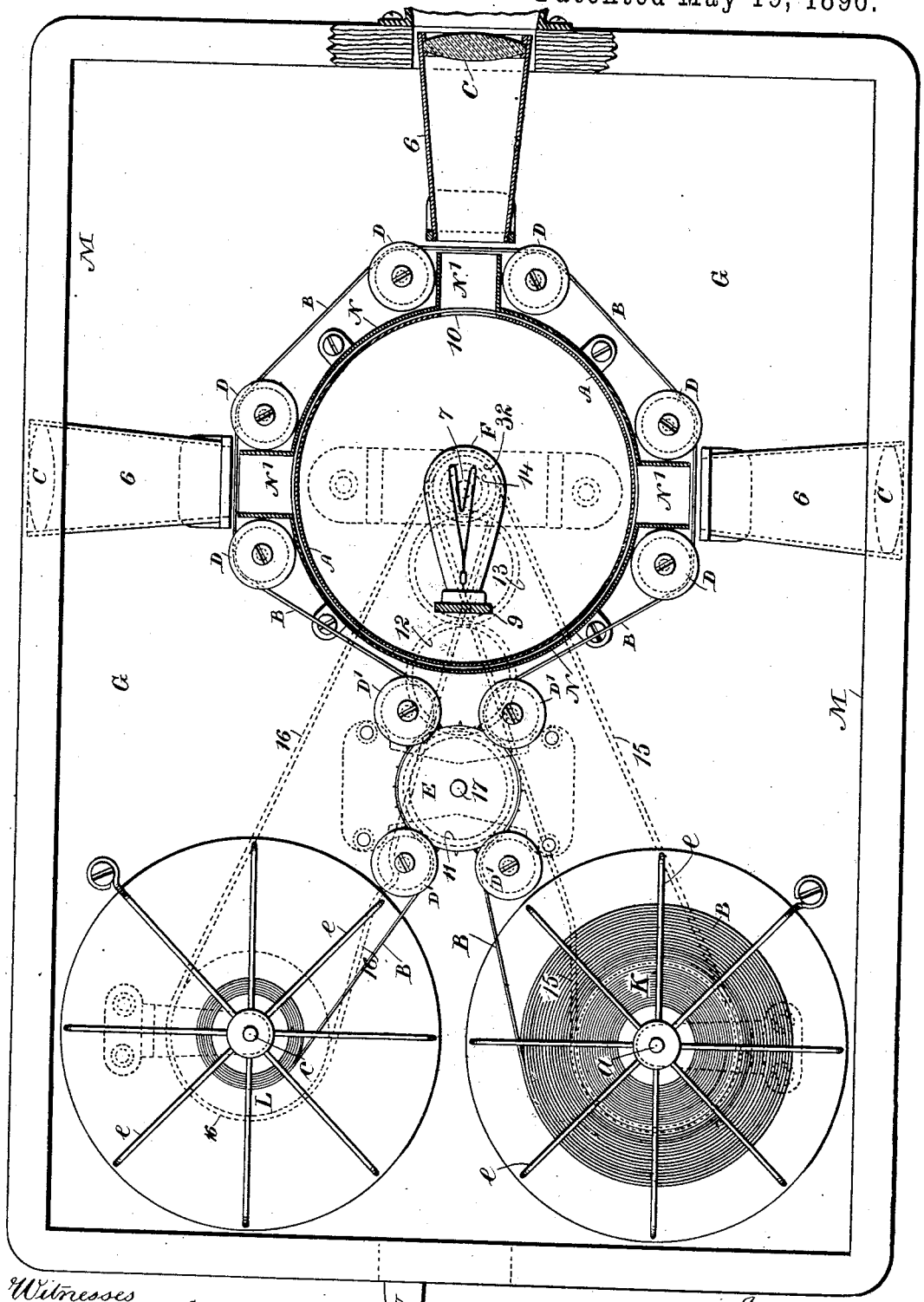

(No Model.) 3 Sheets—Sheet 1.

A. N. PETIT.
APPARATUS FOR EXHIBITING SUCCESSIVE PHOTOGRAPHS.

No. 560,367. Patented May 19, 1896.

Witnesses
Chas. H. Smith
J. Staib

Inventor
Ademor N. Petit
per Lemuel W. Serrell
Atty

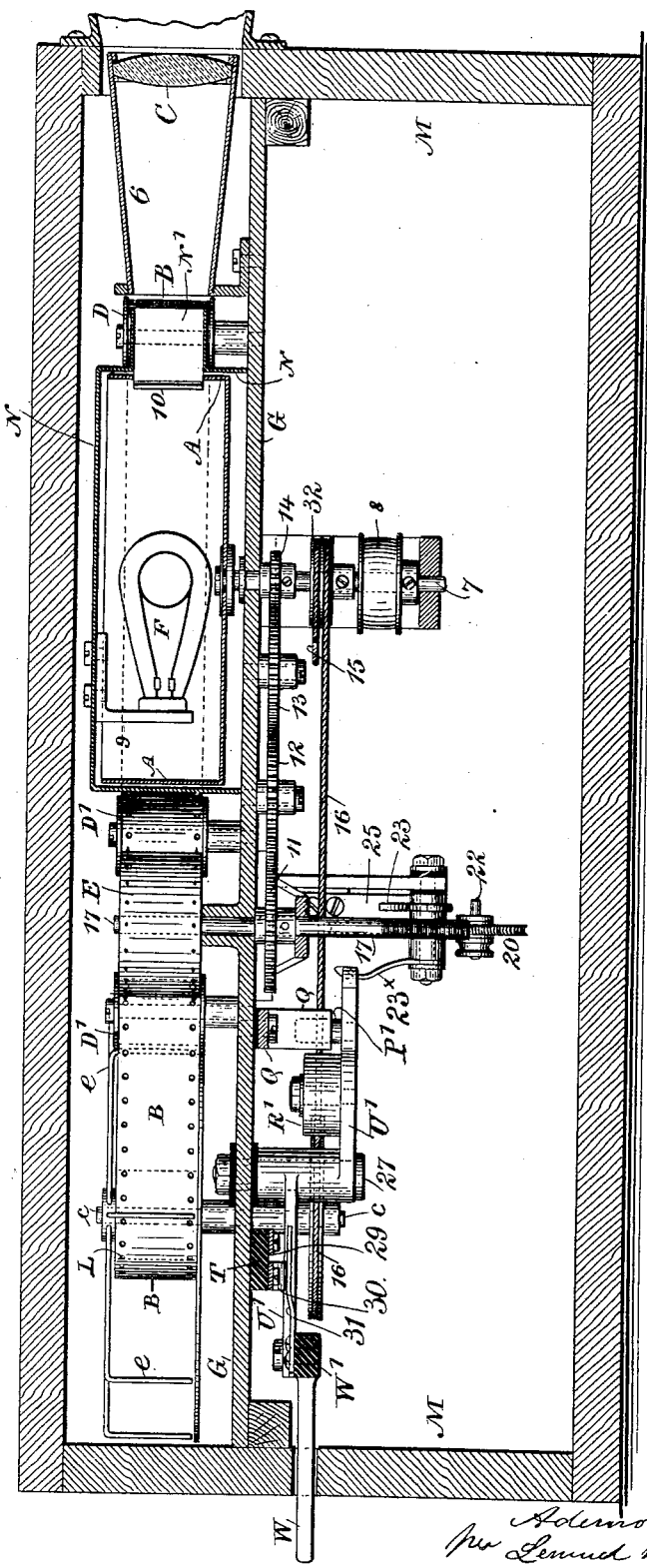

(No Model.) 3 Sheets—Sheet 3.
A. N. PETIT.
APPARATUS FOR EXHIBITING SUCCESSIVE PHOTOGRAPHS.
No. 560,367. Patented May 19, 1896.
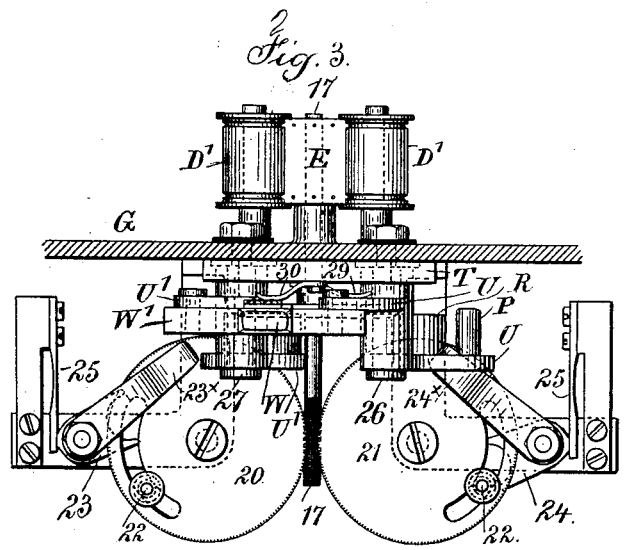
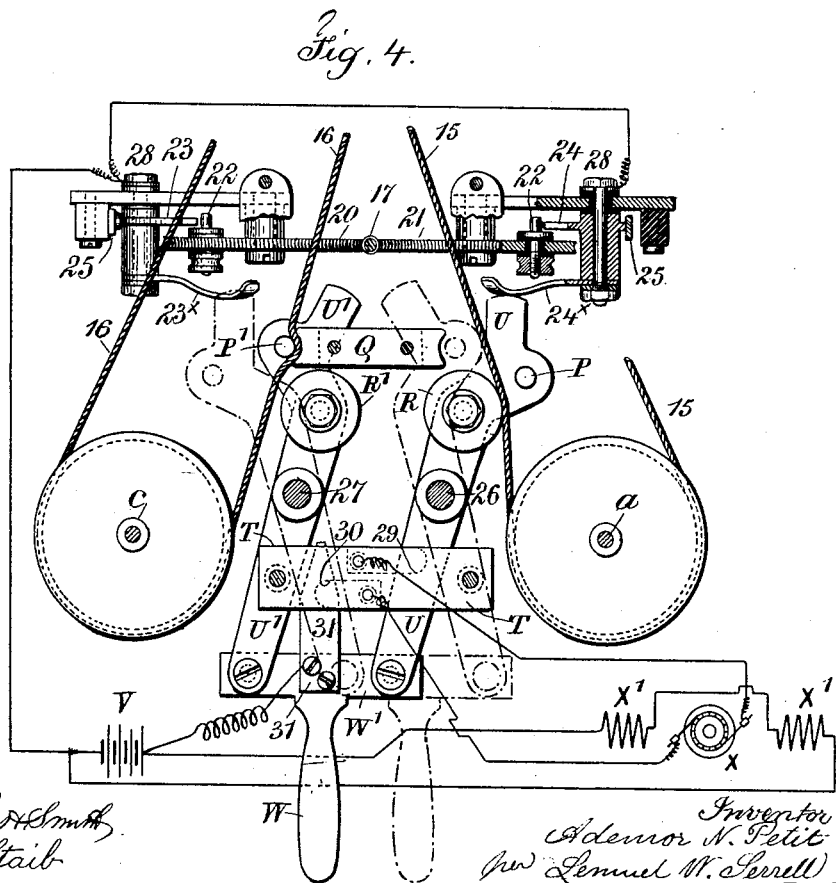

UNITED STATES PATENT OFFICE.

ADEMOR N. PETIT, OF ROSEVILLE, NEW JERSEY, ASSIGNOR TO HIMSELF, AND JOSEPH LIVINGSTON, OF NEW YORK, N. Y.

APPARATUS FOR EXHIBITING SUCCESSIVE PHOTOGRAPHS.

SPECIFICATION forming part of Letters Patent No. 560,367, dated May 19, 1896.

Application filed December 7, 1895. Serial No. 571,343. (No model.)

*To all whom it may concern:*

Be it known that I, ADEMOR N. PETIT, a citizen of the United States, residing at Roseville, in the county of Essex and State of New Jersey, have invented an Improvement in Apparatus for Exhibiting Successive Photographs, of which the following is a specification.

In this improvement the photographs are taken upon a belt that is sensitized, and the apparatus is especially intended for exhibiting by successive photographs a moving object, the pictures upon the belt representing the object or objects in the successive positions that may be assumed, and the pictures are so presented to the eye as to be visible in the successive positions, and thereby appear as if the objects on the picture were in motion.

In carrying out this invention the picture-belt is moved around progressively and at a comparatively slow speed, and there is a light within the curved path through which the picture-belt is caused to travel, and a cylindrical septum is revolved closely adjacent to the back surface of the picture and between the same and the light, and in this cylindrical septum one or more openings are provided, and the parts are so timed that at the moment the picture is presented in line with the eyepiece the opening in the cylindrical septum passes by the picture, allowing the same to be illuminated, and by the time another picture is moved into position the cylindrical septum has made a complete revolution or a second opening in such cylindrical septum has been brought to position, so that the next picture is illuminated.

In the drawings, Figure 1 is a general plan view, partially in section, illustrating the present improvement. Fig. 2 is an elevation, partially in section, illustrating the relative positions of the cylindrical septum, the light, and the picture-belt. Fig. 3 is an elevation representing the circuit-changing devices, and Fig. 4 is a diagrammatic plan view illustrating the electric connections and switches.

The picture-belt B passes around the various guide-pulleys D, and these are circularly disposed around the cylindrical septum A, and eyepieces are arranged radially to the axis of the cylindrical septum, and these eyepieces are each advantageously provided with a lens or magnifying-glass C and a box 6, extending from the lens toward the picture-belt, at one end of which the lens is received, and the other end is open closely adjacent to the picture-belt. These eyepieces may be more or less numerous and arranged in any suitable or convenient manner.

The picture-belt is wound upon a reel K before the exhibition of the pictures is commenced, and it is drawn off the same and wound upon the reel L as such exhibition progresses, and there are guide-pulleys D', around which the picture-belt passes as it is kept in contact with the spur-pulley E, the spurs or projections upon which pulley pass into holes in the picture-belt, so as to insure the proper relative movements of the picture-belt and the cylindrical septum.

The shaft 7 upon which the cylindrical septum A is supported is advantageously made the driving-shaft of the apparatus, and I have shown a pulley 8 by which such shaft may be rotated advantageously by an electric motor, the current to which is controlled as hereinafter described; but I do not limit myself to any particular device for rotating the shaft 7.

The lower edge of the cylindrical septum A is connected to a disk or by arms extending to the shaft 7, so that such septum A forms a hollow cylinder somewhat deeper than the width of the picture-belt B, and within this cylindrical septum light is introduced in any suitable manner. I, however, prefer and use an incandescent electric light F, sustained by a cross-bar 9 and case N, extending up from the plate G, forming the bed of the machine, and this electric light is connected by wires to any suitable source of electric energy, and the cylindrical septum A may be made of sheet metal or any other opaque material, and in such cylindrical septum there is an opening 10, or if the parts are properly timed there may be two or more openings.

Where there is one opening in the cylindrical septum A, the parts are so timed that the opening will pass behind one picture and illuminate the same, and by the time such opening passes in line with the next eyepiece the picture therefor on the belt will be brought into its proper position, and so on around the range of eyepieces that stand radially to the picture-belt, and it will be observed that the guide-pulleys D are arranged so as to keep the picture-belt flat at the time the picture-belt is passing the eyepiece and its box, and the tension upon the belt should be sufficient to keep the picture properly distended, and the guide-pulleys should have flanges at top and bottom to insure the holding of the belt with the pictures in the proper positions.

I have represented a gear-wheel 11 on the shaft 17 of the spur-pulley E and intermediate gears 12 and 13 to the pinion 14 upon the shaft 7, so that the spur-pulley E will be rotated at the proper speed, and the picture-belt will be moved in harmony with the rotation of the cylindrical septum having the opening 10, as aforesaid, and the picture-belt being engaged by the spur-pulley at two places insures uniformity in the outgoing and returning portions of such picture-belt.

It is advantageous to rotate the shafts $a\ c$ of the reels K and L by belts 15 and 16 from pulleys 32 upon the shaft 7, and the sizes of the respective parts are such that the reel L will be rotated sufficiently fast to take up the slack in the picture-belt as the same is delivered to it by the spur-pulley E, and the belt will slip upon the pulleys, and the tension will not be sufficient to injure the picture-belt, and while the picture-belt is being drawn off the reel K and wound upon the reel L the belt 15 will hang comparatively slack and will only apply a slight detaining friction to the reel K.

It is advantageous to drive the apparatus by an electric motor and to combine with the devices before described an automatic switch to stop the motor by breaking the circuit to the same when the picture-belt has been unwound from the reel K, and with this object in view the shaft 17 of the spur-pulley E is extended down and made as a screw-pinion to act upon the wheels 20 21 and rotate the same slowly, and in these wheels are segmental slots with pins 22, that can be clamped in any portion of the slot, so that by adjusting these pins the circuit-changing devices can be moved accurately by the pin in the wheel 21 when the belt has been drawn off the reel K to the desired extent and be moved by the pin in the wheel 20 when the motor has been rotated in the other direction and the picture-belt wound upon the reel K.

I provide circuit-levers 23 and 24 for the respective pins 22 to act against, and these are fitted with springs 25, acting against right-angled knuckles, so as to throw the circuit-levers rapidly in either one direction or the other as soon as the right-angled knuckle passes a line perpendicular to the spring, and these springs are insulated and so also are the pins 22, as seen in Fig. 4, so as to avoid the risk of the circuit being closed incorrectly, and the springs $23^\times$ and $24^\times$ are connected to the levers 23 and 24.

The switch-levers U and U' are pivoted at 26 27 and connected by a link W', from which a handle W projects, so that these switch-levers U and U' can be moved by hand, and when in the position indicated by full lines in Fig. 4 the electric circuit from a suitable battery or generator V to the electric motor X will be closed in such a manner as to rotate the motor in one direction, and when the switch-levers U U' are moved by the handle into the position indicated by dotted lines the circuit connections to the electric motor are changed, so that such motor will be rotated in the opposite direction, and the circuit-levers 23 and 24 and springs $23^\times$ and $24^\times$ are simply employed for breaking the circuit automatically, so that the apparatus will stop, and then the handle W is to be moved into the position that it occupied before to change the circuit connections and reverse the direction of rotation of the motor.

In following out the circuits represented in Fig. 4 it will be observed that the positive pole of the generator is connected to the binding-posts 28 adjacent to the insulated pivots of the levers 23 and 24, so that when the motor is running in one direction the current will pass through $24^\times$ U and a contact-block 29 through the motor X and thence to a contact-block 30, and through the contact 31 on the link W' to the battery, and these contacts 29 and 30 are placed in such a manner that the switch-lever U presses upon the contact 29 when the parts are in the position shown in full lines, and the circuit will be broken and the motor stopped the moment the pin 22 on the wheel 21 swings the circuit-lever $24^\times$ out of contact with the end of the switch-lever U, and when the apparatus is to be started in the opposite direction and the levers U and U' are moved by the handle W the lever U separates from 29 and the lever U' engages the contact 30, and at the same time the end of the lever U' engages the circuit-spring $23^\times$, closing the circuit through 28 $23^\times$ U' 30 and through the motor in the opposite direction, and by 29 and 31 to the battery.

For convenience in the arrangement of the parts I have represented the circuit-levers 23 24 and $23^\times$ and $24^\times$ as near opposite ends of tubular hubs upon the pins of the binding-posts 28. These parts may be arranged in any convenient manner, and it is advantageous to make the portions $23^\times$ and $24^\times$ as springs, so as to yield by the rubbing contact of the ends of the levers U U', and of course it will be understood that the wheels 20 and 21 are rotated first in one direction by the motor and then in the other direction, according to which way the current is being directed through such motor, and that when running in one direction the pin 22 of the wheel 21 acts upon the circuit-lever 24 $24^\times$ to break the circuit with the switch-lever U and stop the motor, and at this time the circuit-lever 23 23× is in position, so that when the switch-levers U U' are moved by hand the end of the lever U' closes the circuit against the spring 23×, and the motor starting in the opposite direction acts upon the parts to wind up the picture-belt upon the other reel, and in so doing the wheels 20 21 are being rotated in the opposite direction and the pin 22 of the wheel 20 acts against the circuit-lever 23 to break the circuit by moving the spring 23× out of contact with the lever U', so as to be ready for the switch-levers U and U' to be again changed by hand.

The insulated contacts 29 and 30 are to be supported in any convenient manner. I have represented them as upon the under side of an insulating-block T beneath the bed-plate or frame G, that carries the operative parts.

When one belt is in operation to wind up the picture-belt upon one of the reels, it requires to be tightened, and at the same time the other belt should be held by a frictional brake sufficient to prevent the other pulley rotating too fast as the picture-belt is unwound. The devices employed in connection with the present apparatus are approximately similar to those shown in my application, Serial No. 563,582, filed September 25, 1895.

In the present device the tightening-pulleys R R' are upon the levers U U', and so also are the clamping-pins P P', and there is a stationary block Q on the plate G, so that when the parts are in the position shown in Fig. 4 the belt 15 is tightened by the pulley R and the belt 16 is held between the pin P' and the block Q, and when the parts are in the position indicated by dotted lines in Fig. 4 the belt 16 is tightened by the pulley R' and the belt 15 is held by the pin P against the end of the block Q.

In Figs. 1 and 2 I have represented an inclosing case M. This may be of any desired character, and in Fig. 1 the top of the case is removed and the case shown in section to represent one of the eyepieces and its box in section, and the picture-belt passes between the inner ends of the boxes 6 and the tubular projections N', that are in line with the boxes, or nearly so, and behind the picture-belt, so as to direct the rays of light upon the back of such picture-belt, the projections N' extending out from the circular case N, within which the cylindrical septum A, having the opening 10, is caused to revolve.

I remark that the device represented at X is only a diagrammatic illustration of an electric motor, showing the commutator bars and brushes and with field-helices X' in series in a shunt of the main circuit; but these parts may be of any desired character, and the electric connections herein described are available for starting and stopping any desired motor electrically.

In Fig. 1 I have only represented the positions of the belts 15 and 16 by dotted lines. The switch-levers and tightening-pulleys and clamps that act upon the same are not represented, to avoid confusion; but the dotted lines indicate the belts 15 and 16 in the positions that they assume when the switch-levers and tightening-pulleys and clamps are in the positions shown in Fig. 4.

In Fig. 2 it will be observed that the parts of the switch-levers U and U' are not in one plane; but they pass as arms away from their pivotal supports in different planes, so as to be more convenient and not to come into contact with the belts 15 and 16 and their pulleys.

I have represented stationary cages above the reels K and L to hold the picture-belt from expanding and passing over the disks forming the bottom ends of the reels.

Each cage is preferably made of radial wires e, extending out from a central hub and turned down vertically and terminating above the disk end of the reel, and one of these arms can be long enough to extend down to the plate G and be fastened thereto, so that the wire cage will not rotate with the reel.

I claim as my invention—

1. The combination with a picture-belt, of a cylindrical septum having an opening in the same and mechanism for revolving the septum and moving the picture-belt in harmony so that the picture when in position is illuminated by the light passing through the opening in the revolving cylindrical septum, substantially as specified.

2. The combination with the picture-belt and guide-pulleys for the same, of a cylindrical septum having an opening therein, means for moving the picture-belt, and eyepieces substantially radial to the cylindrical septum, and a motor for the picture-belt, the parts being arranged and timed so that the opening in the cylindrical septum allows the light to shine upon the picture at the time such picture is in position for the eyepiece, substantially as set forth.

3. A cylindrical septum having an opening in it and means for rotating the same, in combination with a picture-belt, guide-wheels around the cylindrical septum for holding the picture-belt in position, eyepieces through which the pictures are observed, and means within the cylindrical septum for giving light to the pictures, substantially as set forth.

4. The combination with a picture-belt, of a cylindrical septum having an opening in the same and mechanism for revolving the septum and moving the picture-belt in harmony so that the picture when in position is illuminated by the light passing through the opening in the revolving cylindrical septum, and an eyepiece through which the picture is visible, substantially as specified.

5. The combination in an apparatus for exhibiting successive photographs, of a spur-pulley for giving motion to the picture-belt, a screw-pinion upon the shaft of such spur-pulley, two wheels actuated by such screw-pinion, pins adjustable in slots in said wheels, circuit-closing levers, two switch-levers which come in contact with the circuit-closing levers, a handle and connection to the switch-levers and circuit-closing contacts, substantially as specified for stopping the motor and picture-belt, substantially as set forth.

6. The combination in an apparatus for exhibiting successive photographs, of a spur-pulley for giving motion to the picture-belt, a screw-pinion upon the shaft of such spur-pulley, two wheels actuated by such screw-pinion, pins adjustable in slots in said wheels, circuit-closing levers, two switch-levers which come in contact with the circuit-closing levers, a handle and connection to the switch-levers and circuit-closing contacts substantially as specified for stopping the motor and picture-belt, reels upon which the picture-belt is wound, pulleys and belts for driving the same and belt-tighteners and clamps carried by the switch-levers, substantially as set forth.

7. The combination in an apparatus for exhibiting successive photographs, of a picture-belt, a pulley with projections for driving the belt, guide-pulleys for holding the picture-belt in position at the side of the driving-pulley, guide-rollers for holding the belt in position while the pictures are being exhibited, a cylindrical septum having an opening, means for rotating the same, and gearing between the cylindrical septum and the mechanism that drives the picture-belt for insuring harmony in the movements of the picture-belt and of the cylindrical septum, substantially as set forth.

Signed by me this 3d day of December, 1895.

A. N. PETIT.

Witnesses:
   GEO. T. PINCKNEY,
   S. T. HAVILAND.